United States Patent [19]
Tricini

[11] 3,817,559
[45] June 18, 1974

[54] RISER ASSEMBLY
[75] Inventor: John D. Tricini, Greensburg, Pa.
[73] Assignee: Kerotest Manufacturing Corp., Pittsburgh, Pa.
[22] Filed: Sept. 22, 1972
[21] Appl. No.: 291,191

[52] U.S. Cl. ................................ 285/47, 285/174
[51] Int. Cl. .......................................... F16l 11/12
[58] Field of Search ......... 285/47, 174, 169, 48, 50, 285/53, 54, 55

[56] References Cited
UNITED STATES PATENTS

| | | | |
|---|---|---|---|
| 1,746,095 | 2/1930 | Tugwell | 285/174 X |
| 2,764,452 | 9/1956 | Anderson et al. | 285/174 X |
| 2,776,151 | 1/1957 | Harkenrider | 285/174 |
| 3,612,584 | 10/1971 | Taylor | 285/174 |

Primary Examiner—Dave W. Arola
Attorney, Agent, or Firm—Stanley J. Price, Jr.

[57] ABSTRACT

A riser assembly for the connection of an underground gas line to a meter or other device includes a tubular polyethylene adapter having its lower end connected to the upper end of a polyethylene tubular member, which is connected at its lower end to the underground pipeline. A connecting sleeve of corrosion resistant, electrically nonconductive material, such as a combination of fiber glass and epoxy resin, maintains the upper end of the adapter in spaced relationship to the lower end of a metallic tubular member, which is connected at its upper end to the meter or other device. A polyethylene support sleeve surrounds the outer surface of the mutually connected end portions of the adapter and the lower tubular member. The adjacent ends of the lower portion connecting sleeve and upper portion of the adapter are maintained in fluid-tight engagement by the combination adapter support sleeve and resilient O-ring secured in the upper portion of the adapter. The riser assembly can also include a metallic outer support conduit surrounding the riser assembly and extending from the connection between the lower end of the metallic upper tubular member and the upper end of the connecting sleeve to a point at the lower end of the lower polyethylene tubular member near the connection to the underground pipeline. The outer support conduit may be closed for storage or transport at its upper end by an epoxy seal and at its lower end by a resilient end plug.

10 Claims, 5 Drawing Figures

PATENTED JUN 18 1974 3,817,559

RISER ASSEMBLY

BACKGROUND OF THE INVENTION

1. Field of the Invention

This invention relates to a riser assembly for connection of underground pipelines to meters and other devices and relates more particularly to a riser assembly for connection to non-metallic pipelines and having an upper metallic support member of high mechanical strength protected against corrosion by a noncorrosive, electrically nonconductive, connecting sleeve.

2. Description of the Prior Art

Riser assemblies for the connection of meters, gages and other devices to an underground pipeline are well known in the art. Use of steel or other metals in the construction of the riser assembly is subject to the disadvantage of corrosion and destruction of the riser assembly by oxidation or electrolytic corrosion from underground galvanic action and eddy currents. The construction of underground pipelines with polyethylene pipe or other plastic pipe necessitates the use of polyethylene adaptors and connectors and similar devices. However, structural members fabricated of polyethylene and similar materials do not have the mechanical strength required for those riser assembly members exposed above the surface of the ground.

It is desirable to provide a riser assembly adapted for connection to a polyethylene underground pipeline having sufficient mechanical strength above ground.

SUMMARY OF THE INVENTION

This invention provides a riser assembly for connection to an underground pipeline of polyethylene and similar materials and includes a corrosion resistant, electrically nonconductive first tubular member of adapter and a metallic second tubular member mounted above the first tubular member and connected therebetween by a connecting sleeve of noncorrosive electrically nonconductive material, preferably fabricated of a combination of fiber glass and epoxy resin.

The metallic second tubular member includes means at its end remote from the first tubular member for connection to a meter of other device. The connecting sleeve may be connected by threads to the remote ends of the first and second tubular members. The connecting threads on the connecting sleeve may be of a size different from the threads on the remote ends of the first and second tubular members to permit bonding and sealing of the threaded connections with a bonding agent such as epoxy resin.

A noncorrosive, electrically nonconductive third tubular member is connected at one end to the underground pipeline and at its other end to the end of the first tubular member remote from the second tubular member. A noncorrosive, electrically nonconductive support sleeve surrounds the outer surfaces of the connection between the first and third tubular members.

A noncorrosive, electrically nonconductive adapter support sleeve mounted within the upper portion of the adapter urges the adapter against the lower portion of the connecting sleeve. A resilient O-ring contained within a circular groove formed on the outer surface of the upper portion of the adapter at a point above the threaded connection between the adapter and connecting sleeve maintains a fluid-tight connection between the upper end of the adapter and the threaded connection.

A metallic outer support conduit encasing the riser assembly provides greater mechanical strength and support for the assembly and extends continuously from the lower portion of the metallic second tubular member above its connection to the connecting sleeve continuously to the end of the third tubular member remote from the first tubular member near the connection to the underground pipeline. The opposite ends of the outer support conduit may be closed with a seal of epoxy resin, with a noncorrosive, electrically nonconductive end plug and a resilient O-ring contained therein at the end of the metallic outer support conduit near the underground pipeline.

This invention provides a riser assembly for connection to an underground polyethylene or other plastic material pipeline and having an upper metallic tubular member protected from galvanic and electrolytic corrosion by a noncorrosive, electrically conductive connecting sleeve.

This invention also provides a riser assembly having a noncorrosive, electrically nonconductive connecting sleeve protected from deterioration by exposure to the actinic rays of the sun.

This invention also provides a riser assembly having an upper metallic tubular member protected by an insulating connecting sleeve which is connected, by a polyethylene adapter, to a polyethylene service pipe constructed and arranged for rapid, inexpensive and simple connection to an underground polyethylene pipeline.

Other advantages and details of this invention will become apparent by reference to the appended drawings and to the following detailed description thereof.

DESCRIPTION OF THE PREFERRED EMBODIMENTS

Figure 1:
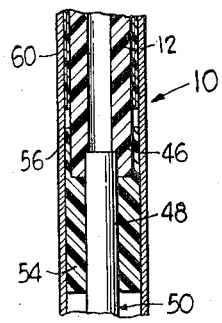
FIG. 1 is a fragmented cross sectional view in side elevation of the connection of the first tubular member to the service pipe mounted on the support sleeve of the riser assembly of this invention.

In FIG. 1, a riser assembly indicated generally by reference numeral 10 includes a first tubular member or adapter 12 fabricated from polyethylene or any similar material that is electrically nonconductive and resistant to corrosion by oxidation, electrolytic or galvanic corrosion and other types of corrosion.

Figure 3:
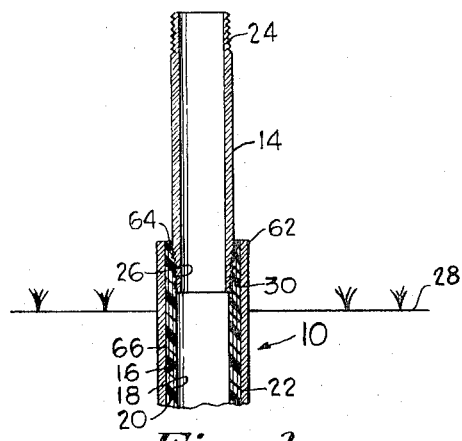
FIG. 3 is a fragmented cross sectional view in side elevation of the threaded connection between the connecting sleeve and the second tubular member contained within the outer support conduit of this invention.

A second tubular member 14 is connected to the upper end of adapter 12 by connecting sleeve generally indicated by reference numeral 16 and second tubular member 14 extends substantially above ground level 28, as illustrated in FIG. 3. Because second tubular member 14 is subjected to impact and other stresses above ground level 28, second tubular member 14 is constructed of steel or another suitable metal. Fabrication of second tubular member 14 from steel provides a high degree of strength and rigidity to resist impact stresses and for protection against fire and other hazards.

Connecting sleeve 16 has a plurality of individual layers 18, 20 and 22 and is fabricated from a corrosion resistant, electrically nonconductive material and preferably is fabricated from a rigid, fiber reinforced, resinous composition such as glass fiber reinforced with epoxy resin. Connecting sleeve 16 has a plurality of individual layers 18, 20 and 22 of fiber reinforced resin. The layers are formed by helically winding a resin impregnated fiber, preferably an epoxy resin impregnated glass fiber, woven over a cylindrical mandrel having an outside diameter substantially equal to the diameter of the second tubular member 14 and the adapter 12.

The winding of the resin impregnated fibers may be performed in conventional fashion. For example, a glass fiber roving comprising a plurality of individual glass fibers may be first drawn through an epoxy resin bath and helically wound upon a mandrel to provide a first, or innermost fiber reinforced layer 18 of connecting sleeve 16. Thereafter, without breaking or cutting the glass fiber roving, a second layer 20 of resin impregnated fibers is then overwound upon the second layer 20 obtaining the desired thickness for connecting sleeve 16. Where desired, a suitable polymerization catalyst or curing agent can be added to the epoxy resin bath for hardening connecting sleeve 16, or the resin can be hardened or cured by subjecting connecting sleeve 16 to an elevated temperature during and/or after formation of the sleeve.

Second tubular member 14 has an upper end 24 adapted for connection to a meter of other device by suitable means such as a ¾ – 14 NPT thread. The lower end 26 of the metallic second tubular member 14 is externally threaded for connection to the internal threads on the upper end 30 of connecting sleeve 16.

The threaded upper end 30 of connecting sleeve 16 can be formed integrally of sleeve 16 by winding resin impregnated fibers upon a threaded mandrel. In a second manner, threaded upper end 30 can be formed on connecting sleeve 16 by butting threads into a completely curved or hardened sleeve 16. The threads of threaded upper end 30 of connecting sleeve 16 are preferably either somewhat oversized or somewhat undersized with respect to the threads on the lower end 26 of the second tubular member 14.

Figure 2:
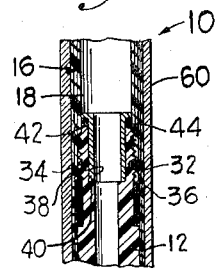
FIG. 2 is a fragmented cross sectional view in side elevation of the threaded connection between the first tubular member and the connecting sleeve of this invention.

As shown in FIG. 2, the adapter 12 has formed in its upper end 32 an external thread constructed and arranged for engagement with the internal threads on the lower end 34 of connecting sleeve 16. The threaded lower end 34 of connecting sleeve 16 is formed in the same manner as described above for the threaded upper end 30 of connecting sleeve 16. It is also preferred that the internal threads at lower end 34 of connecting sleeve 16 be of a size different from the external threads on the upper end 32 of adapter 12.

The size differential of the threads of threaded upper end 30 of connecting sleeve 16 with respect to the threads of threaded lower end 26 of the second tubular member 14 and with respect to the threads of threaded upper end 32 of adapter 12 provides a loosely fitting threaded connection between the respective tubular members and the connecting sleeve 16. With such construction, a coating of adhesive cement or resin may be applied between the threads on connecting sleeve 16 and the threads on adapter 12 and on second tubular member 14 to provide a more effective seal and a stronger connection. Suitable adhesive cements or resins are those capable of forming a high strength, metal to resin bond. Most preferred is an epoxy resin. The cement or resin may be applied either to the threads of the tubular members 14 and 12, or to both. Curing of the cement bond between the threads can be obtained in conventional fashion, such as by including a conventional curing agent in admixture with the cement prior to application of the cement.

The upper end 32 of adapter 12 (shown in FIG. 2) has formed therein an internal socket 36 adapted to receive adapter support sleeve 38 which is preferably fabricated from a non-corrosive, electrically nonconductive material such as polyethylene. The adapter support sleeve 38 in which is formed an internal circular shoulder 40 engages adapter 12 and rigidly maintains adapter 12 in a fluid tight engagement with the lower end 34 of connecting sleeve 16. Preferably, adapter support sleeve 38 should have an outer diameter larger than the inner diameter of the upper end 32 of adapter 12.

A circular groove 42 is provided at the upper end 32 of adapter 12 between the adapter support sleeve 38 and the first or innermost fiber reinforced layer 18 of connecting sleeve 16. Circular groove 42 is adapted to receive O-ring 44 of resilient or other suitable material which supports and maintains the lower end 34 of connecting sleeve 16 in spaced relation away from the upper end 32 of adapter 12 while providing a fluid tight seal around the ends 34 and 32.

The lower end 46 of adapter 12 (illustrated in FIG. 1) has formed therein an internal socket connection adapted to receive the upper end 48 of a third tubular member 50. Third tubular member 50 is a service pipe which is fabricated from a noncorrosive, electrically nonconductive material, such as polyethylene, having a lower end 52 adapted for rapid and simple connection to a polyethylene or other plastic gas pipeline or similar line. For example, the lower end 52 of service line 50 can be connected to the internal socket end of an adapter similar to lower socket end 46 of adapter 12.

The connection of the lower end 46 of adapter 12 to the upper end 48 of service pipe 50 can be strengthened by the mounting on riser assembly 10 support sleeve 54, which is preferably fabricated from a non-corrosive, electrically non-conductive material such as polyethylene. Support sleeve 54 has an upper end 56 in which is formed an internal circular shoulder 58 whereby support sleeve 54 is adapted to receive and engage the lower end 46 of adapter 12 while engaging and securing service pipe 50 within support sleeve 54 and the lower end 46 of adapter 12. Preferably, support sleeve 54 should have an outer diameter substantially equal to, or slightly larger than, the outer diameter of the resin reinforced fiber glass connecting sleeve 16.

An optional preferred structural element for riser assembly 10 is an outer support conduit 60 fabricated of steel or other suitable metal. Outer support conduit 60 completely surrounds the other members of riser assembly 10 in FIG. 3 from the upper end 62 of outer support conduit 50 which extends slightly above the upper end 30 of connecting sleeve 16 to the lower end 68 of outer support conduit 60 which terminates a short distance from the lower end 52 of service pipe 50 to permit connection of lower end 52 of service pipe 50 to the underground pipeline (shown in FIG. 5). The metallic outer support conduit 60 can be added to riser assembly 10 to provide greater support strength and protection to the other structural members of riser assembly 10.

In FIG. 3, outer support conduit 60 is closed at its upper end 62 by an upper epoxy resin seal 64 formed and secured in the annular space between the internal surface of the upper end 62 of outer support conduit 60 and the external surface of the metallic second tubular member 14. The upper epoxy resin seal 64 is formed with sufficient length to its lower end 66 to secure the outer support conduit 60 to the upper portion of connecting sleeve 16 and to provide a fluid tight seal between outer support conduit 60 and connecting sleeve 16. It is desirable that upper epoxy resin seal 64 fill substantially completely the annular space at the upper end 62 of outer support conduit 60 between the internal surface of the upper end 62 of outer support conduit 60 and the external surface of the metallic second tubular member 14 to prevent corrosion of second tubular member 14 and the upper end 62 of outer support conduit 60 by galvanic or electrolytic corrosion between the two metal members.

Figure 5:
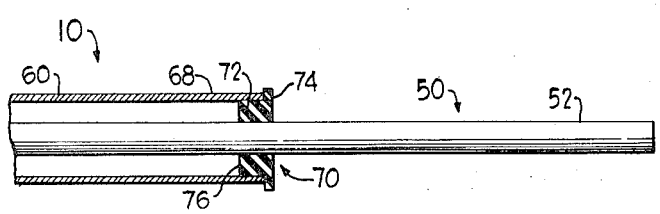
FIG. 5 is a fragmented cross sectional view of the lower end of the outer support conduit sealed by the annular end plug and mounted on the service pipe.
Figure 4:
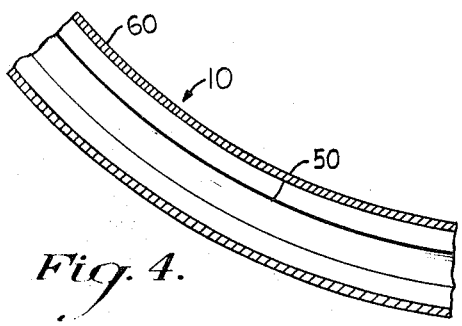
FIG. 4 is a fragmented cross sectional view in side elevation of the outer support conduit surrounding the service pipe leading from its connection to the support sleeve of the riser assembly of this invention.

In FIG. 5, the lower end 68 of outer support conduit 60 is sealed by an annular end plug 70 fabricated of resilient, corrosion resistant, electrically nonconductive material and mounted on service pipe 50 within the annulus between service pipe 50 and outer support conduit 60 near the extreme end of lower end 68 of outer support conduit 60. End plug 70 includes a body portion 72 mounted longitudinally within the annulus between service pipe 50 and outer support conduit 60 adjacent the extreme end of lower end 68 of outer support conduit 60 to form a fluid tight seal therebetween. Extending radially of service pipe 50 flange portion 74 of end plug 70 forms a shoulder 76 with body portion 72 provided to sealingly engage lower end 68 of outer support conduit 60. Preferably, flange portion 74 should have an outer diameter greater than the outer diameter of outer conduit 60 so that a fluid tight seal is maintained around the outer surface of service pipe 50.

Meter riser assembly 10, adapter 12 and second tubular member 14 are assembled with connecting sleeve 16 in a manner as described above. If outer support conduit 60 is not used, the lower end 46 of adapter 12 is inserted in support sleeve 54 and service pipe 50 is thereafter inserted through support sleeve 54 into engagement with the socket connection at the lower end 46 of adapter 42.

If outer support conduit 60 is used, the assembled second tubular member 14, connecting sleeve 16, and adapter 12 with the adapter support sleeve 38 and O-ring 44 attached at the upper end thereof with support sleeve 54 attached at the lower end thereof, are inserted in the outer support conduit 60 through the upper end thereof while the service pipe 50, contained in the outer support conduit 60, is inserted and secured in support sleeve 54 and the lower end 46 of adapter 12.

The position of the upper end 30 of connecting sleeve 16 is set slightly below the top of the upper end 62 of outer support conduit 60, the epoxy resin seal 64 is formed and secured in the annulus between the upper end 62 of outer support conduit 60 and the upper end 30 of connecting sleeve 16. End plug 70 is inserted over the lower end 52 of service pipe 50 and the internal surface of the lower end 68 of outer support conduit 60. The assembly members of the riser assembly 10 are secured in outer support member 60 by support sleeve 54, end plug 70 and the epoxy seal 64.

According to the provisions of the patent statutes, I have explained the principle, preferred construction and mode of operation of my invention and have illustrated and described what I now consider to represent its best embodiments. However, it should be understood that, the invention is not limited to the particular embodiments disclosed herein but may be variously practiced within the scope of the following claims.

I claim:

1. A riser assembly for an underground pipeline including, a first tubular member having first connecting means at its lower end and second connecting means at its upper end, said first tubular member constructed of a corrosion resistant, electrically nonconductive material, a metallic second tubular member mounted above the first tubular member and having a first connecting means at one end and a second connecting means to the other end thereof, said second connecting means spaced from the first tubular member and arranged to connect said metallic second tubular member to another desired device, a connecting sleeve connected to the first tubular member second connecting means and to said second tubular member first connecting means, said connecting sleeve constructed of a corrosion resistant, electrically nonconductive, rigid material, a third tubular member connected at its upper end to the first connecting means at the lower end of the first tubular member remote from said connecting sleeve and having second connecting means to said underground pipeline at the end of said third tubular member remote from said first tubular member, said third tubular member fabricated of corrosion resistant, electrically nonconductive material, and a metallic fourth tubular member positioned in said first tubular member adjacent to said connecting sleeve, said metallic fourth tubular member operable to maintain said first tubular member in fluid tight engagement with said connecting sleeve.

2. A riser assembly for an underground pipeline as set forth in claim 1 wherein, said connecting sleeve encloses the lower portion of the second tubular member and the upper portion of the first tubular member.

3. A riser assembly for an underground pipeline as set forth in claim 1 wherein, the connecting sleeve is bonded around the adjacent ends of the first and second tubular members to form a fluid-tight seal around said adjacent ends.

4. A riser assembly for an underground pipeline as set forth in claim 1 wherein, the second tubular member has external threads at its lower end, the first tubular member has external threads at its upper end, and the connecting sleeve has internal threads constructed and arranged to engage the threads on each of the lower end of the second tubular member and the upper end of the first tubular member.

5. A riser assembly for an underground pipeline as set forth in claim 1 which includes, a support sleeve constructed of corrosion resistant, electrically nonconductive material, said support sleeve surrounds the external surfaces of the adjacent connected ends of the first tubular member and the third tubular member.

6. A riser assembly for an underground pipeline as set forth in claim 1 which includes, a metallic adapter support sleeve connected at its lower end to the second connecting means within the internal surface at the upper end of the first tubular member adjacent the lower end of the connecting sleeve and extending longitudinally within the upper portion of the first tubular member.

7. A riser assembly for an underground pipeline as set forth in claim 1 wherein, an O-ring fabricated of resilient material is contained within a circular groove formed within the external surface at the upper portion of the first tubular member and abutting the lower portion of the connecting sleeve maintaining the lower portion of said connecting sleeve in spaced relation away from the upper portion of said first tubular member and, said O-ring provides a fluid tight seal around each end of the upper portion of the first tubular member and the lower portion of the connecting sleeve.

8. A riser assembly for an underground pipeline as set forth in claim 7 which includes, a metallic tubular outer support conduit substantially enclosing the riser assembly and extending continuously from the lower portion of the second tubular member and the connecting sleeve to the lower portion of the third tubular member adjacent said means for connection to the underground pipeline.

9. A riser assembly for an underground pipeline as set forth in claim 8 which includes, corrosion resistant, electrically nonconductive, fluid tight first sealing means secured between said connecting sleeve and said outer support conduit around the connection between said connecting sleeve and said second tubular member, said sealing means extending along the outer surface of said second tubular member above the connection of said second tubular member to said connecting sleeve and separating the inner surface of said metallic outer support conduit from the outer surface of said metallic second tubular member.

10. A riser assembly for an underground pipeline as set forth in claim 8 which includes, a resilient, corrosion resistant, electrically nonconductive fluid tight end plug secured between the end portion of said metallic tubular outer support conduit and the lower portion of said third tubular member adjacent said means for connection to the underground pipeline, said end plug therein surrounds the lower portion of said thrid tubular member in fluid-tight engagement and maintains a fluid-tight seal between the lower end of said metallic outer support conduit and the lower portion of said third tubular member adjacent said means for connection to said underground pipeline.

* * * * *

UNITED STATES PATENT OFFICE
CERTIFICATE OF CORRECTION

Patent No. 3,817,559   Dated June 18, 1974

Inventor(s) John D. Tricini

It is certified that error appears in the above-identified patent and that said Letters Patent are hereby corrected as shown below:

| | |
|---|---|
| Column 1, Line 36 | After "member" delete 'of' and insert --or-- |
| Column 2, Line 20 | After "electrically" delete 'conductive' and insert --nonconductive-- |
| Column 5, Line 6 | After "conduit" delete '50' and insert --60-- |

In the Claims

| | |
|---|---|
| Claim 1, Line 11 | After "means" delete 'to' and insert --at-- |
| Claim 10, Line 10 | After "said" delete 'thrid' and insert --third-- |

Signed and Sealed this fourth Day of November 1975

[SEAL]

Attest:

RUTH C. MASON  
Attesting Officer

C. MARSHALL DANN  
Commissioner of Patents and Trademarks